United States Patent
Nareddy et al.

(10) Patent No.: US 12,243,536 B2
(45) Date of Patent: *Mar. 4, 2025

(54) AUTOMATICALLY RECOGNIZING AND SURFACING IMPORTANT MOMENTS IN MULTI-PARTY CONVERSATIONS

(71) Applicant: Outreach Corporation, Seattle, WA (US)

(72) Inventors: Krishnamohan Reddy Nareddy, Bellevue, WA (US); Abhishek Abhishek, Sammamish, WA (US); Rohit Ganpat Mane, Seattle, WA (US); Rajiv Garg, Seattle, WA (US)

(73) Assignee: Outreach Corporation, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/233,303

(22) Filed: Aug. 12, 2023

(65) Prior Publication Data

US 2023/0386477 A1 Nov. 30, 2023

Related U.S. Application Data

(63) Continuation of application No. 17/179,125, filed on Feb. 18, 2021, now Pat. No. 11,763,823.
(Continued)

(51) Int. Cl.
*G06F 16/9535* (2019.01)
*G06F 16/334* (2025.01)
(Continued)

(52) U.S. Cl.
CPC .......... *G10L 17/14* (2013.01); *G06F 16/3344* (2019.01); *G06N 20/00* (2019.01); *G06F 16/9535* (2019.01)

(58) Field of Classification Search
CPC .......... G06F 16/9535; G06F 16/7844
See application file for complete search history.

(56) References Cited

U.S. PATENT DOCUMENTS 8,818,995 B1 * 8/2014 Guha .................. G06F 16/951
707/722
9,548,998 B1 1/2017 Barros et al.
(Continued)

FOREIGN PATENT DOCUMENTS

EP 3217605 A1 9/2017

OTHER PUBLICATIONS

PCT International Search Report and Written Opinion, PCT Application No. PCT/US2021/018592, Apr. 27, 2021, 11 pages.
(Continued)

*Primary Examiner* — Feng-Tzer Tzeng
(74) *Attorney, Agent, or Firm* — Fenwick & West LLP

(57) ABSTRACT

A system and a method are disclosed for identifying a subjectively interesting moment in a transcript. In an embodiment, a device receives a transcription of a conversation, and identifies a participant of the conversation. The device accesses a machine learning model corresponding to the participant, and applies, as input to the machine learning model, the transcription. The device receives as output from the machine learning model a portion of the transcription having relevance to the participant, and generates for display, to the participant, information pertaining to the portion.

20 Claims, 10 Drawing Sheets

Related U.S. Application Data

(60) Provisional application No. 62/987,525, filed on Mar. 10, 2020.

(51) Int. Cl.
   *G06N 20/00*    (2019.01)
   *G10L 17/14*    (2013.01)

(56)        References Cited

U.S. PATENT DOCUMENTS

| | | |
|---|---|---|
| 10,791,217 B1 | 9/2020 | Bussey |
| 2009/0067719 A1* | 3/2009 | Sridhar ................ G06F 40/289 382/176 |
| 2010/0228777 A1* | 9/2010 | Imig .................... G06F 16/285 707/E17.108 |
| 2011/0153761 A1 | 6/2011 | Anderson |
| 2012/0124147 A1 | 5/2012 | Hamlin et al. |
| 2014/0026070 A1 | 1/2014 | Tandon et al. |
| 2014/0187208 A1 | 7/2014 | De Oliveira et al. |
| 2016/0065891 A1 | 3/2016 | Goetz |
| 2017/0293618 A1 | 10/2017 | Gorrepati |
| 2018/0357531 A1* | 12/2018 | Giridhari ................ G06F 18/24 |
| 2019/0005024 A1 | 1/2019 | Somech et al. |
| 2019/0074987 A1 | 3/2019 | Wiener et al. |
| 2019/0384854 A1 | 12/2019 | Mahmoud |
| 2020/0252442 A1 | 8/2020 | Brown et al. |

OTHER PUBLICATIONS

United States Office Action, U.S. Appl. No. 17/179,125, Jan. 10, 2023, 11 pages.

European Patent Office, Extended European Search Report and Written Opinion, European Patent Application No. 21767955.4, Feb. 1, 2024, 7 pages.

\* cited by examiner

AUTOMATICALLY RECOGNIZING AND SURFACING IMPORTANT MOMENTS IN MULTI-PARTY CONVERSATIONS

CROSS REFERENCE TO RELATED APPLICATIONS

This application is a continuation of U.S. application Ser. No. 17/179,125, filed Feb. 18, 2021, which claims the benefit of U.S. Provisional Application No. 62/987,525, filed Mar. 10, 2020, the disclosure of which are hereby incorporated by reference herein in their entirety.

TECHNICAL FIELD

The disclosure generally relates to the field of machine learning, and more particularly to applying machine learning to natural language understanding.

BACKGROUND

Meeting recordings and transcriptions are useful to maintain a record of the conversations that took place during a meeting. These recording allow users to go back in time and review the conversations. However, in their entirety, they are too verbose to quickly identify moments which are important or contribute towards the outcome of the meeting. Moreover, individuals will have different subjective preferences for what they would like to review within a conversation. Thus, attempts to automate searches for certain keywords within conversations would amount to a one-size-fits-all approach that is unlikely to surface moments to users that those users, as individuals, think are in fact important.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 illustrates one embodiment of a system environment for implementing a moment service.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium includes a moments service that receives a transcription of a conversation (e.g., in real-time as a web meeting occurs), and identifies a participant of the conversation (e.g., a person logged into a web meeting). The moments service accesses a machine learning model corresponding to the participant, and applies, as input to the machine learning model, the transcription. The moments service receives as output from the machine learning model a portion of the transcription having relevance to the participant, and generates for display, to the participant, information pertaining to the portion.

System Environment of Moment Service

Figure 1:
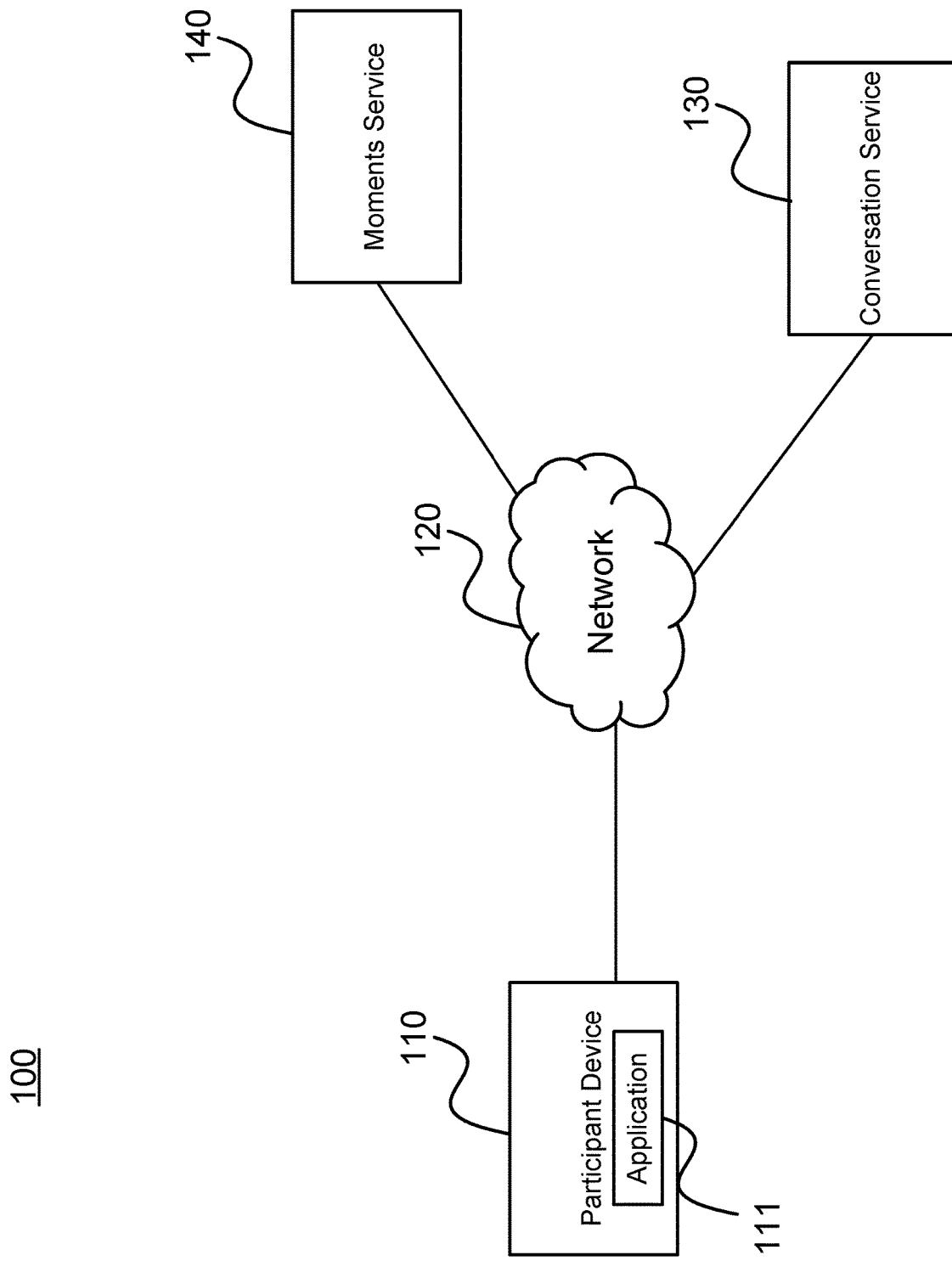

Figure (FIG. 1 illustrates one embodiment of a system environment for implementing a moment service. As depicted in FIG. 1, environment 100 includes participant device 110 with application 111 installed thereon, network 120, conversation service 130, and moments service 140. Participant device 110 is a client device that can be used by a participant in connection to a conversation. Exemplary client devices include smartphones, laptops, tablets, personal computers, personal data assistants, Internet-of-Things devices, and any other electronic device including a user interface through which a connection to moments service 140 is achievable. While only one participant device is depicted in FIG. 1, any number of participant devices 110 may be present in a conversation. The term participant, as used herein, may refer to a human being present during a conversation. The term conversation, as used herein, may refer to a meeting including two or more participants. The meeting may be in-person, virtual (e.g., through a telephonic or video conference), or a combination of the two, where some participants are meeting in person, while are others are connected to the conversation virtually.

In an embodiment, participant device 110 is present during a conversation, but is not used to connect the participant to the conversation. For example, a user may carry participant device 110 into an in-person meeting, or may place participant device 110 within audio range of a virtual meeting (e.g., where a microphone of participant device 110 can receive spoken sound from the participant and at least one other participant, e.g., through a speaker of a different device). In an embodiment, participant device 110 is used to connect the participant to a conversation (e.g., participant device 110 is used to join a video conference over the web).

Application 111 may be a dedicated application installed on participant device 110 (e.g., as distributed by moments service 140). Alternatively, application 111 may be accessed (e.g., from moments service 140) via a browser installed on participant device 110. Application 111 may be used to receive requests from a participant to search through transcript, audio, and/or video data of a conversation. The requests may pertain to prior conversations and/or to a current conversation, where the participant wishes to search for information that occurred earlier in the current conversation. Application 111 may transmit the request to moments service 140, and receive results. Application 111 may display the results to the participant. During a current conversation, application 111 may receive a command from moments service 140 to surface information pertaining to the current conversation that is subjectively interesting to the user, even where no request was made by the user to surface such information. Similarly, application 111 may determine, without receiving information from moments service 140, interesting information from a current conversation and may surface that information to the participant during the current conversation.

Network 120 may be any data network, such as the Internet, a local area network, wide area network, and so on. Network 120 facilitates data communications between participant device 110 and moments service 140 (and other services, such as conversation service 130).

Conversation service 130 may be any service that facilitates a remote conversation between two or more participant devices. Conversation service 130 may be combined with moments service 140, or may be a stand-alone service.

Moments service 140 provides back-end functionality to surface moments of a conversation that are subjectively interesting to given participants. Moments service 140 may proactively surface moments (e.g., in real-time during a current conversation), or responsively may surface moments based on user requests. More information about moments service 140 is described below with reference to FIG. 2.

Figure 2:
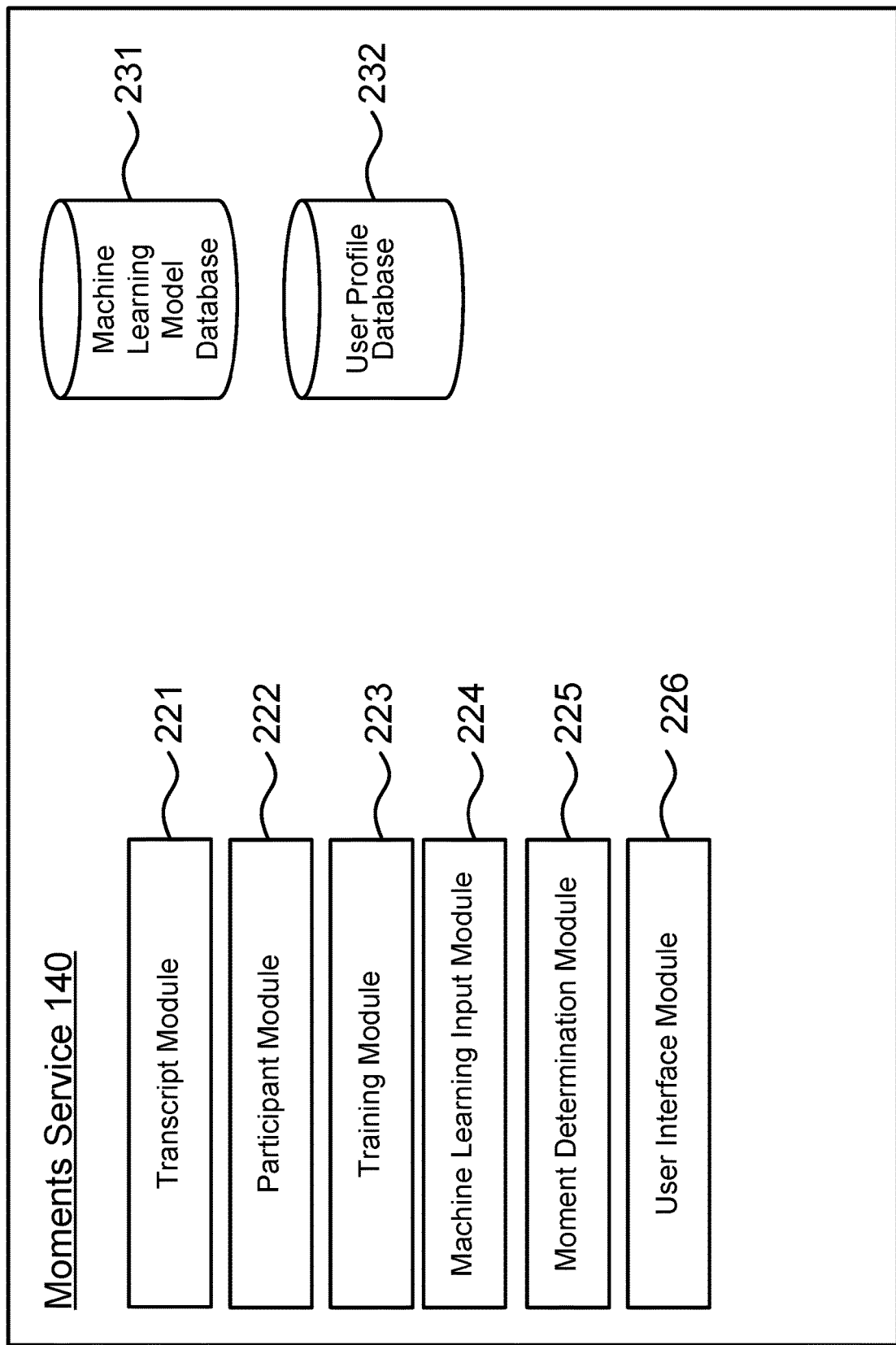
FIG. 2 illustrates one embodiment of exemplary modules and databases used by the moment service.

FIG. 2 illustrates one embodiment of exemplary modules and databases used by the moment service. As depicted in FIG. 2, moments service 140 includes transcript module 221, participant module 222, training module 223, machine learning input module 224, moment determination module 225, user interface module 226, machine learning model database 231, and user profile database 232. The modules and databases depicted in FIG. 2 are merely exemplary; fewer or more modules and/or databases may be used to achieve the functionality disclosed herein. Moreover, some or all of the modules and/or databases may be instantiated by a third party and/or by application 111 on client device 110. The modules and databases of moments service 140 may be distributed across multiple computing devices (e.g., servers).

Transcript module 221 receives and/or generates a transcript of a conversation. In an embodiment, transcript module 221 transcribes spoken words into text as the words are spoken (e.g., in real-time). As used herein, the term real-time may include processing delays that prevent activity (e.g., a transcription) from occurring at an exact instant that corresponds to a triggering event (e.g., detecting spoken words). Alternatively, transcript module 221 may ingest a recording of a conversation, and may generate a transcript therefrom. Transcript module 221 may detect activity other than spoken words, and may include that activity in the transcript. For example, if a text chat feature is used during the conversation by a participant, the text entered by the participant may be added to the transcript by transcript module 221. As another example, if web links are shared during the conversation, those web links may be added to the transcript by transcript module 221. Where visual activity is introduced (e.g., a slide deck, video, screen share, and so on), transcript module 221 may extract text and/or images from the visual activity and may include the extracted elements in the transcript.

Participant module 222 identifies participants in the conversation. In an embodiment, participants indicate their identities to conversation service 130 (e.g., using login credentials or by simply indicating their name when joining a conversation), in which case participant module 222 uses the indicated identity to identify a participant. Participant module 222 may, additionally or alternatively, identify participants based on characteristics of the transcript. For example, if a speaker states "John, will you take care of this?", and another speaker responds "Sure.", then participant module 222 may identify the responding speaker as John. Participant module 222 may determine whether a statement of a speaker is useable to identify a participant based on whether a given statement indicated in the transcript corresponds to a template. For example, participant module 222 may query a template database for templates that match spoken statements as the transcript is generated, and where a match exists, participant module 222 may follow instructions associated with the template (e.g., identify the next speaker based on a name uttered by the prior speaker). Participant module 222 may augment a transcript with a name of a participant who uttered words, or who otherwise generated content that appears on the transcript.

Training module 223 trains machine learning models that correspond to participants. The models are trained to surface moments of a conversation to participants that are likely to be subjectively interesting to those participants. In an embodiment, training module 223 trains a model for each participant in a conversation. In another embodiment, training module 223 trains a model for each potential participant known to moments service 140 who may join a conversation. In an embodiment, rather than train models individually for users, training module 223 may train a model for a segment of users, the segment defined by an administrator or other super user, or based on some criteria. For example, training module 223 may train different models for different departments of an enterprise, where each participant within a department shares a same model.

In order to train models for individuals, training module 223 accesses a user profile from user profile database 232. The term user profile, as used herein, may refer to a collection of data that describes historical activities performed by a user, in addition to demographic information about a user (e.g., place of residence, gender, etc.). The historical activities of the user may include activities by the user with regard to searching transcripts of conversations. For example, a user may search for conversations including certain keywords more frequently than other keywords. Keywords used in historical searches through conversation transcripts may be indicated within a user's profile, along with frequency information (e.g., how often the user searches for transcript data having that keyword) and/or recency information (e.g., how recently, relative to a present time, has the user searched through conversation transcripts for that keyword). Any other historical activity of the user with regard to activities separate from searching conversation transcripts that is indicated in the user profile may be used to train a model, but, in an embodiment, may be weighted lower than a weight assigned to search activities that relate to searching conversation transcripts. The term weight may be interchangeably used with "strength of association" herein.

Training module 223 uses the data from the user profile to train the machine learning model. Specifically, training module 223 may determine from the user profile whether the results of a keyword search yielded an interesting moment for the user. Training module 223 may perform this determination by determining whether the user reviewed the search result for at least a threshold amount of time, and/or otherwise interacted with the search result (e.g., by copying/cutting and pasting data from the result, by running another query based on the result, and so on). Training module 223 may apply a label to the keyword(s) used in the query that indicates that the search result did, or did not, yield an interesting moment for the user. The keyword(s)-label pairs may be input as training data into a model, thus yielding a trained model specific to a given participant. The training data may be weighted based on frequency and/or recency of use of given keywords. Where a model is being trained for a segment of users, training module 223 trains the model in the same manner as described above with a user-specific model, except that user profiles for users corresponding to that segment are used together, rather than using an individual's profile in isolation. Training module 223 identifies which users belong to a segment based on information in the profiles that indicate a segment to which the users belong.

Machine learning input module 223 accesses a machine learning model corresponding to the participant from machine learning model database 231. In an embodiment, where a model is trained for the participant, machine learning input module 223 accesses that model. In another embodiment, machine learning input module 223 may determine whether a group model (interchangeably used to refer to a model trained for a segment, as described above) or an individual model should be accessed the user. The determination may be based on settings associated with the conversation (e.g., an administrator of the conversation indicates whether individual or group models should be used). Machine learning input module 223 may determine whether to use the individual or group model based on a policy. For example, a policy may indicate that where a certain number or percentage of participants are from a given segment, then the group model for that segment should be used, otherwise, the individual model should be used.

In an embodiment, prior to applying a transcript to a machine learning model, machine learning input module 224 may determine, based on text of the transcription, a stage corresponding to the transcription. For example, a conversation may be geared toward preliminary planning, details of execution, or a finished project. Machine learning input module 224 may determine the stage using heuristics (e.g., by associating keywords in the transcript to stages), or by machine learning (e.g., where a model is trained to ingest the transcript and output a stage based on keyword-stage label pairs).

Machine learning input module 224 applies, as input to the accessed machine learning model, the transcription. This may occur as the transcription is generated during a conversation, and/or after-the-fact (e.g., when a participant or other user manually requests to search for interesting moments of a past conversation). Where machine learning input module 224 is operating during a conversation, different models for different participants may be accessed, and the transcript may concurrently be applied to those different models to enable a surfacing of moments to different users that are tailored to those different users.

In an embodiment, machine learning input module 224 may augment the transcript prior to inputting the transcript into the machine learning model. Machine learning input module 224 may identify one or more word embeddings corresponding to the transcription, and may apply, as additional input to the machine learning model, the one or more word embeddings. The word embeddings may be identified using a thesaurus or knowledge graph, where machine learning input module 224 uses the thesaurus or knowledge graph to identify synonyms or other words that are highly associated with keywords of the transcript. In an embodiment, such augmentation may occur on some, but not all keywords of the transcript. For example, augmentation may occur with respect to keywords that are frequently used and/or have been recently used (e.g., based on a comparison of frequency and/or recency information from a user's profile for a given keyword against a respective threshold), and may not occur with keywords that do not satisfy these parameters.

Moment determination module 225 receives, as output from the machine learning model accessed for the participant, a portion of the transcription having relevance to the participant. In an embodiment, moment determination module 225 may receive as output from the machine learning model probabilities that different portions of the transcription have relevance to the participant. Moment determination module 225 may determine one or more portions of the transcript that qualify as moments based on their corresponding probabilities exceeding a threshold. Alternatively, moment determination module 225 may receive an indication a highest ranking portion of the transcript that has a highest probability relative to other portions of the transcript, and may determine that portion to be a moment that would be subjectively interesting to the participant.

User interface module 226 generates for display, to the participant, information pertaining to the portion. In an embodiment where this occurs while a conversation is occurring, user interface module 226 may overlay, on top of the conversation, the portion itself, or other information pertaining to the portion. For example, if a conversation is about a public figure in a particular context that is determined to be likely to be subjectively interesting to a participant, a link to a news article about the public figure in that context may be surfaced to the participant. Overlaying the portion or the other information is one example embodiment, but any other manner of conveying the information may be performed by user interface module 226 (e.g., by pushing a notification to client device 110 of the participant, outputting in any known manner the information via application 111, and so on).

User interface module 226 may be used by users for other functionality, such as searching for interesting moments in conversations by way of keyword searches. As users interact with user interface module 226, user profile database 232 may be updated to reflect the interactions, which may in turn cause updates to one or more machine learning models corresponding to those users. For example, if a moment is surfaced to a user and the user does or does not interact with it, this activity (or lack thereof) may be logged, and may improve or reduce an association in the model between the user and one or more given keywords. In an embodiment where there are users of a group who are not part of a conversation, where a group model was used to surface a moment to a participant, user interface module 226 may surface the moment to other users who belong to the group.

Computing Machine Architecture

Figure 3:
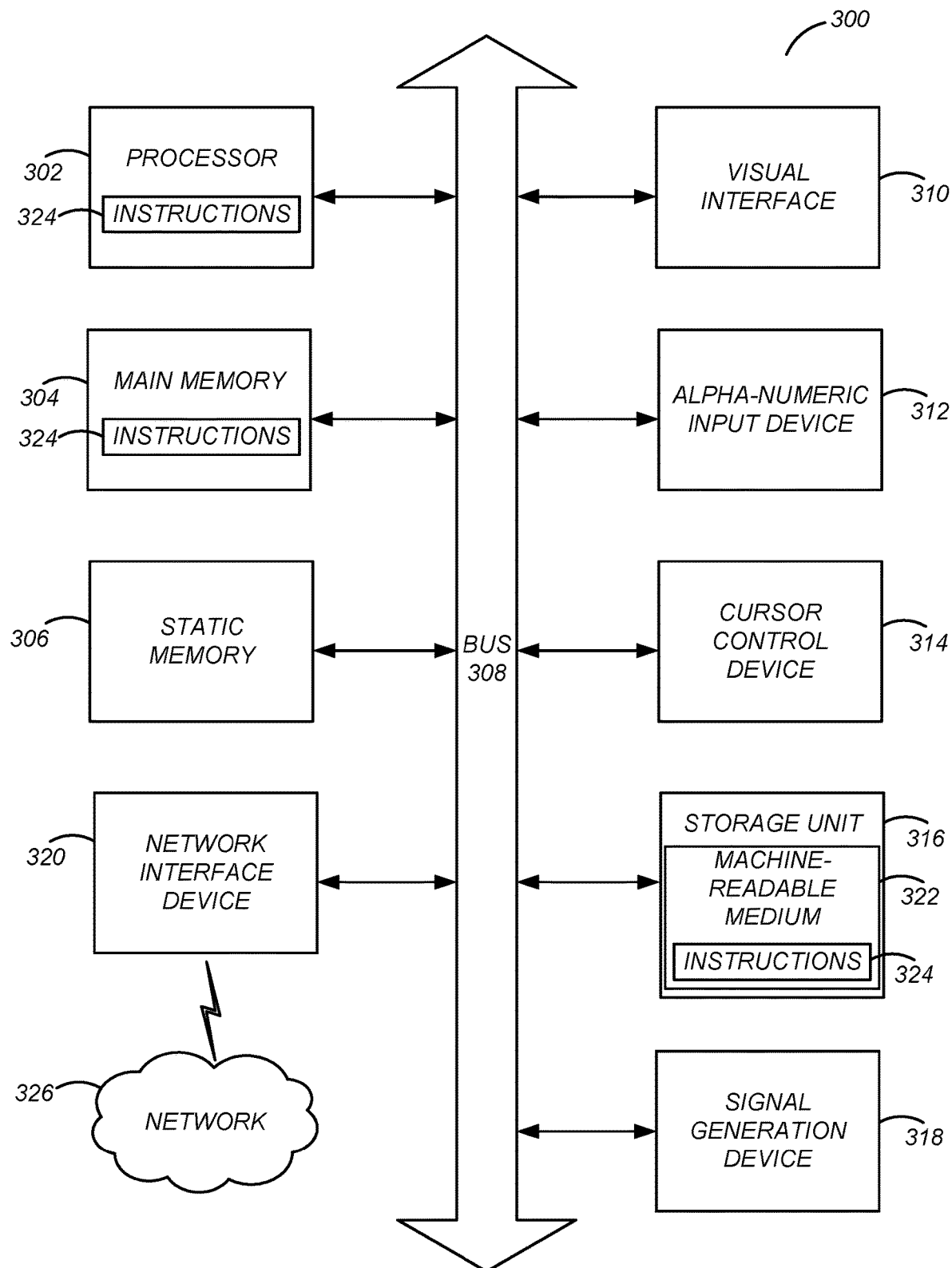
FIG. 3 is a block diagram illustrating components of an example machine able to read instructions from a machine-readable medium and execute them in a processor (or controller).

FIG. 3 is a block diagram illustrating components of an example machine able to read instructions from a machine-readable medium and execute them in a processor (or controller). Specifically, FIG. 3 shows a diagrammatic representation of a machine in the example form of a computer system 300 within which program code (e.g., software) for causing the machine to perform any one or more of the methodologies discussed herein may be executed. The program code may be comprised of instructions 324 executable by one or more processors 302. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 324 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 300 includes a processor 302 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 304, and a static memory 306, which are configured to communicate with each other via a bus 308. The computer system 300 may further include visual display interface 310. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 310 may include or may interface with a touch enabled screen. The computer system 300 may also include alpha-numeric input device 312 (e.g., a keyboard or touch screen keyboard), a cursor control device 314 (e.g., a mouse, a trackball, a joystick, a motion sensor, or other pointing instrument), a storage unit 316, a signal generation device 318 (e.g., a speaker), and a network interface device 320, which also are configured to communicate via the bus 308.

The storage unit 316 includes a machine-readable medium 322 on which is stored instructions 324 (e.g., software) embodying any one or more of the methodologies or functions described herein. The instructions 324 (e.g., software) may also reside, completely or at least partially, within the main memory 304 or within the processor 302 (e.g., within a processor's cache memory) during execution thereof by the computer system 300, the main memory 304 and the processor 302 also constituting machine-readable media. The instructions 324 (e.g., software) may be transmitted or received over a network 326 via the network interface device 320.

While machine-readable medium 322 is shown in an example embodiment to be a single medium, the term "machine-readable medium" should be taken to include a single medium or multiple media (e.g., a centralized or distributed database, or associated caches and servers) able to store instructions (e.g., instructions 324). The term "machine-readable medium" shall also be taken to include any medium that is capable of storing instructions (e.g., instructions 324) for execution by the machine and that cause the machine to perform any one or more of the methodologies disclosed herein. The term "machine-readable medium" includes, but not be limited to, data repositories in the form of solid-state memories, optical media, and magnetic media.

Exemplary Data Flow

Figure 4:
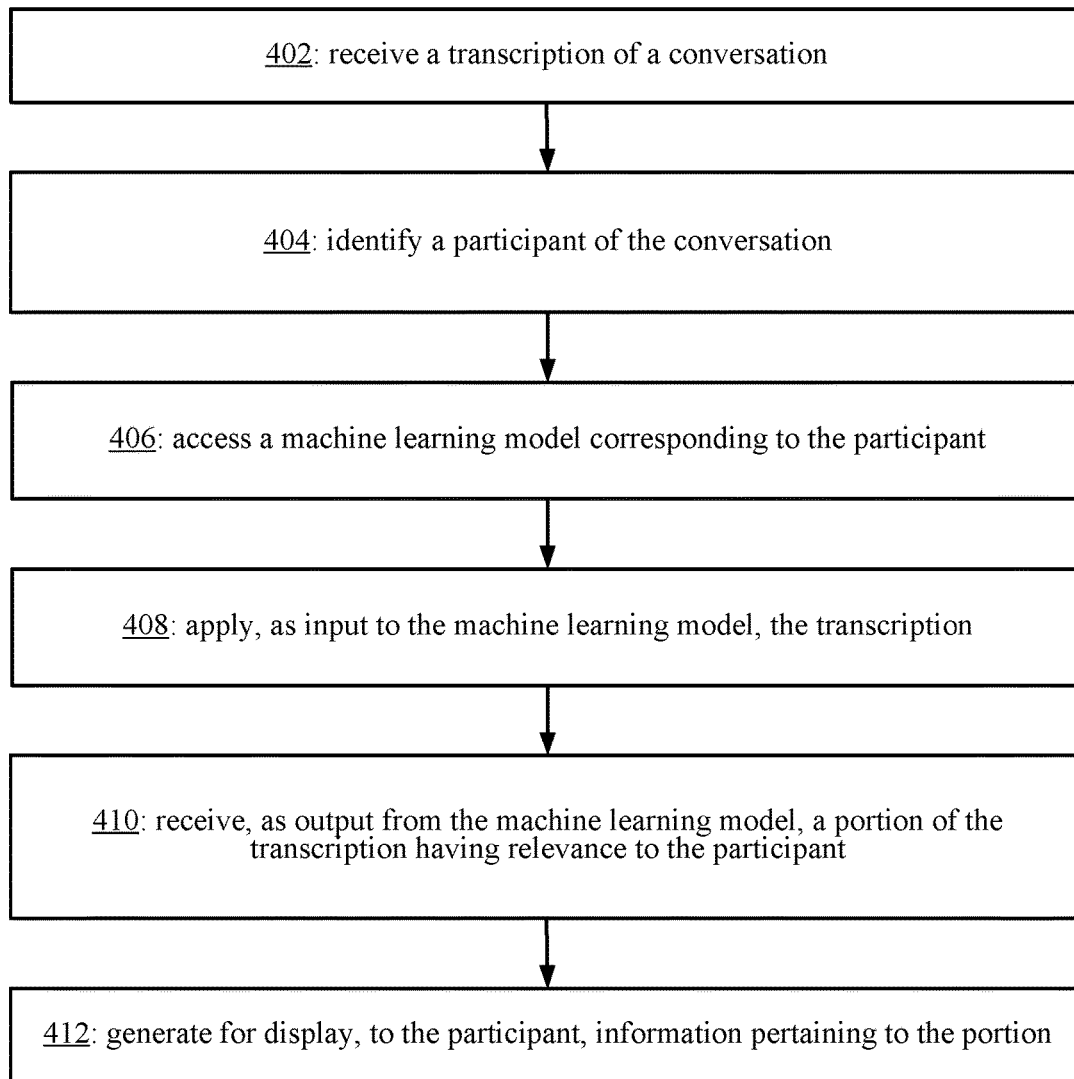
FIG. 4 is an exemplary data flow showing a process for identifying relevant moments to a conversation participant, in accordance with one embodiment.

FIG. 4 is an exemplary data flow showing a process for identifying relevant moments to a conversation participant, in accordance with one embodiment. Process 400 begins with moments service 140 receiving 402 a transcription of a conversation (e.g., using transcript module 221). Moments service 140 identifies 404 a participant of the conversation (e.g., using participant module 222). Moments service 140 accesses 406 406 a machine learning model corresponding to the participant (e.g., using machine learning input module 224 to access a machine learning model from machine learning model database 231).

Moments service 140 applies 408, as input to the machine learning model, the transcription (e.g., using machine learning input module 224). Moments service 140 receives 410, as output from the machine learning model, a portion of the transcription having relevance to the participant (e.g., using moments determination module 225. Moments service 140 generates for display 412, to the participant, information pertaining to the portion (e.g., using user interface module 226.

Exemplary Use Cases and Implementations

Figure 5:
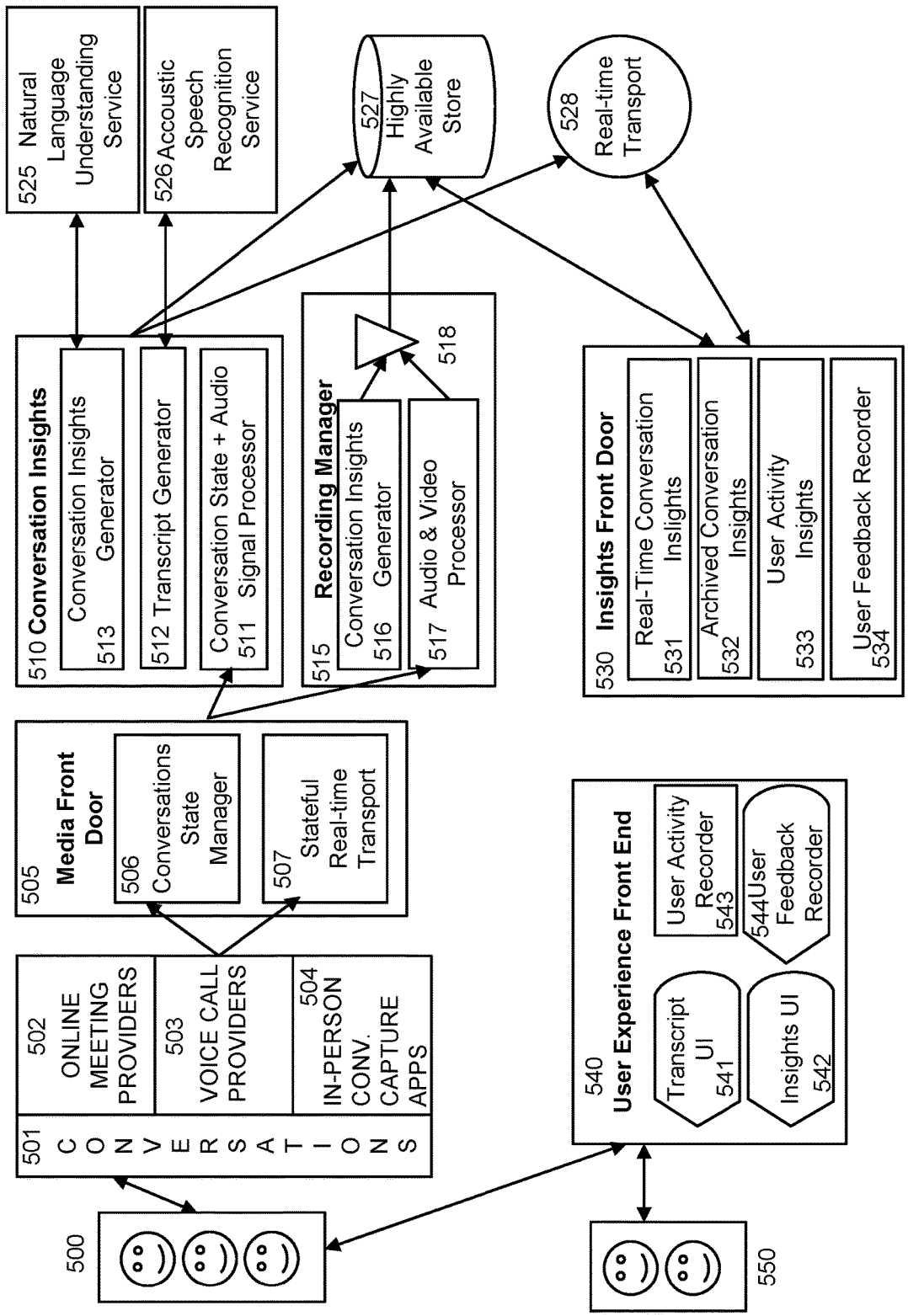
FIG. 5 shows one embodiment of an exemplary end to end system incorporating features described with respect to FIGS. 1-4.

FIG. 5 shows one embodiment of an exemplary end to end system incorporating features described with respect to FIGS. 1-4. Referring to FIG. 5, 500 represents participants in a live conversation. Examples of a live conversation are online meetings, phone calls, and in-person meetings. 501 represents conversations enabled by various providers and platforms such as online meeting providers (502), voice call providers (503), and applications that capture the content of in-person meetings (504).

Audio, Video, and other media signals captured by 502-504 are transmitted, by a processor, to a Media Front Door (505). The Media Front Door may be a module configured to process and distribute the captured media signals to various service components for further processing. A Conversation State Manager (506) tracks the state of a conversation and its participants. The term Conversation State as used herein may refer to information such as list of current participants and who is speaking at the moment. A processor may use the conversation state used to generate relevant insights in substantially real-time (e.g., within a threshold amount of time after an utterance is processed). The term real-time, as used herein, may encompass near-real-time scenarios, where information is processed within a threshold amount of time upon receipt, and outputs are provided such that they are perceived to a human being as being instantaneous or near-instantaneous. A Stateful Real-time Transport (507) mechanism maintains a persistent connection to various downstream services and transmits media and state for real-time processing.

510 represents a module that processes Conversation Insights, where the incoming media streams and conversation state are processed to provide a range of actionable insights in real-time. Conversation state and media signals are processed by 511 which sends the audio signal to an Acoustic Speech Recognition Service (526) and receives real-time transcript of the conversation. The Transcript Generator (512) uses the conversation state and a transcript of the conversation to generate a transcript of the conversation. This transcript is processed by the Conversation Insights Generator (513), which uses a Natural Language Understanding service (525) to generate a variety of actionable insights in real-time.

The term Natural Language Understanding (NLU) service (525) is used in a generic sense here to refer to any system that processes natural language text and performs one or more specific tasks. Examples of such tasks are, but not limited to, a) intent classification, where a fragment of text is examined to infer if it conveys one or more predetermined intents, b) named entity recognition (NER), where entities such as names of people and places, date and time, currencies, etc. are extracted and normalized, and c) dialog generation, where the task involves generating new text or actions to drive a conversation (dialog). All tasks performed by a NLU service share some common characteristics. First, the task has to be well defined. For example, the task of intent classification involves identifying the range of intents to be recognized by the system. Second, one or more Machine Learning models have to be trained and tuned to perform the task. Third, training the model involves capturing and processing training data. The quality of the inference drawn by the NLU system is strongly influenced by the training phase. The utility of the inference is strongly influenced by the task definition and how it is used downstream.

An Acoustic Speech Recognition (ASR) system (526) processes an acoustic signal (speech) and generates a textual representation of that speech. Generally speaking, an ASR system performs two distinct tasks. First, it interprets the audio signal to extract the building blocks (phonemes, words etc.) of an utterance. This task is aided by an Acoustic Model (AM). While a typical ASR service provides a default Acoustic Model to represent a range of acoustic environments, some services provide users the ability to customize the model to suit their specific needs. For example, an acoustic model would be tuned differently for conversations on a factory floor vs. a conversation in a shopping mall. The second task performed by an ASR is composition of an utterance (words, phrases, sentences etc.). This task is aided by a Language Model (LM). A typical ASR service provides a default Language Model to represent a range of human conversations, some services provide users the ability to customize the model. For example, a conversation between an enterprise salesperson and a customer would have different language characteristics (vocabulary, abbreviations, context etc.) than a conversation between an airline pilot and an air traffic controller. As with any AI system, the quality of the inference (speech) by the ASR is influenced by the quality of the models used for the inference.

The system depicted in FIG. 5 is designed for real-time use (users represented by 500) as well as offline use by users (550) who peruse a pre-recorded conversation. The Recording Manager (515) receives the same data and signals as the real-time Conversation Insights system (510) and processes the data/signal and stores it for later use. A Conversation State Processor (516) handles changes to a conversation state such as list of participants, current active speaker(s), and other metadata. The Audio and Video media processor (517) processes and encodes the media signal. Processing involves encoding and compressing the audio/video signal with an eye towards efficient storage and truthful reproduction for later rendering. The conversation state and corresponding media are combined for recording in such a way as to recover the relevant context and content to enable playback of an archived conversation. For example, if an offline user (550) wishes to playback audio/video corresponding to an utterance, the system locates the time of that utterance, seeks to that point in the recorded conversation, and renders the audio/video from that moment.

Various parts of the end to end system are producing and consuming various pieces of information in real-time as well as storing them for offline use. Two types of services are employed to facilitate the real-time flow and persistent storage of all the intermediate and final fragments of data produced by the system. A Real-time Transport (528) service is responsible for efficiently encoding, transmitting, and decoding various signals in a secure manner between various components. Where appropriate, the Real-time Transport service also handles authentication to prevent unauthorized access to the service. For example, when the Transcript Generator (512) generates an utterance, we need to move it to the Front End (540, described below) in real-time so it can be rendered to the conversation participants (500).

A Highly Available Store (527) is used to store and retrieve data. Data may be indexed as needed for efficient retrieval. The store also handles authentication to protect against unauthorized use and enforces data retention policies.

The transcript and insights provided by the system are delivered to the User Experience Front End (540) to be rendered to users (online—500 and offline—550). The Insights Front Door (530) sits between the system backend and the front end, which is operating from the public internet. The Insights Front Door isolates the front end from the backend to protect the backend from unauthorized access. Once a connection is established with a client, various components of the Insights Front Door are used to send and receive data to and from the front end. Real-Time Conversation Insights (531) determines what clients should receive the real-time transcript and insights for a specific conversation and forwards them to those specific connected clients. As mentioned earlier, the system supports offline users (550), who can review previously archived conversations. Archived Conversation Insights (532) receives requests for access to a specific archived conversation and works with the backend to retrieve and return transcripts and insights for that conversation.

The User Experience Front End (540) is the client interacting with users who are either participating in a real-time conversation or viewing an archived conversation. 540 may, in part or in whole, be installed on a client device of a participant and/or a reviewer. The Transcript UI (541) and the Insights UI (542) display transcripts and insights to the user. The transcripts and insights generated by the system are products of machine learning models. A human user may find them less than ideal for their use and may choose to edit them to a) provide feedback to the system and b) to have a more accurate record of the conversation. For example, the speech recognition system may have transcribed a word incorrectly ("what about that tax?" instead of "what about that task?) prompting a conversation participant to edit that. 541 and 542 accept such feedback from users. A user may access a selectable option to edit any portion of a transcript. Feedback is captured by the User Feedback Recorder (544) and forwarded to the system through the User Feedback Recorder (534) in Insights Front Door (530). Some types of feedback result in other updates. For example, when a user edits an utterance (e.g. "tax" to "task" above), the edited utterance may trigger a new insight. Alternatively, the edit may nullify a previously generated insight that is no longer relevant, considering the feedback provided by the user.

The system is designed to provide personalized, relevant insights to its users. It uses metadata and a priori knowledge about users to generate such personalized insights. The system is designed to benefit from awareness of user's activity and preferences as expressed by their interaction with the system. The User Activity Recorder (543) records such activity, with user's implicit or explicit permission, and forwards it to the backend through the User Activity Recorder (533).

As a user engages with the system of FIG. 5, the system records user activity that expresses the user's interest in specific utterances. Responsive to the system having collected sufficient data for a given user, that data may be used to automatically detect and score utterances based on that user's subjective preferences in real-time and present them to the user in real-time.

Moments relevant to a user are derived from two major sources of user actions:

When a user manually searches for specific keywords (and keyphrases; we will use keywords to mean both) in his/her meeting transcripts, those queries will also be captured by our system. Over time, a profile of the user is developed, where preferences of the user are determined. Thus, these keyword searches provide insights into what is important to the user and can be ranked further based on their recency and frequency of search across meetings, calls and recordings of in-person conversations.

A user can manually mark certain moments in the meeting as important by marking transcription of an utterance either while a conversation is happening in real-time or while listening to a recorded conversation. These manually marked utterances serve as expressions of user interest and help the system surface similar utterances as moments of interest in future conversations.

A keyword could be a query for an exact match. For example, a user may have searched for "John Smith" to capture all moments where that person was mentioned. A keyword could also be used as a proxy for a concept or a broader category. For example, terms such as "bug", "crash", "unresponsive", and "hung" may have been used to focus on moments that are discussing problems with a software product. Since we do not know the specific sense a user intended to use a keyword to capture moments of interest, we will evaluate each known keyword for multiple senses.

When a keyword is found in an utterance, we consider that utterance to be more relevant than an utterance that doesn't contain a keyword. We further quality the relevance by the nature of the match—a case-sensitive match is better than a case-insensitive match. A full keyword match is better than a match of a stem/lemma ("computer" and "computing" both have the stem "comput").

Even when a keyword is not explicitly found in an utterance, variations of that keyword may be present. For example, if a user used keywords "bug" and "crash" to look for moments discussing problems with a software product, restricting a match to only those two words would miss moments where participants of a conversation may have used keywords "defect" and "hung". We will use word embeddings for each keyword to capture related senses of that keyword. Word embeddings for conversational use are widely available for all popular human languages. If a general purpose model is deemed insufficient for a specialized domain, specialized word embeddings can be easily created from a sufficiently large body of domain specific text using unsupervised machine learning.

Users may be searching for some keywords more often than others. They may also have refined their use of keywords over time. For example, they may have used the term "unresponsive" and over time learned that they are better off using the term "hung" to improve their chances of locating a moment of interest. The system, when profiling a user and otherwise determining preferences of the user, may account for recency and frequency of use of a keyword by favoring more recent and more frequently used keywords over those that were not used recently and used infrequently.

The system may classify previously identified moments as expressions of interest. When the system encounters similar utterances in other transcripts, those similar utterances may be surfaced as moments of potential interest to the user in real-time. A sentence is a collection of keywords. As mentioned above, the system computes word embeddings. The technique can be generalized to a sentence, to create sentence embeddings. A sentence embedding is obtained by combining embeddings of its constituent words. A simple approach takes the average of all words to arrive at a sentence embedding. A more sophisticated approach accounts for the relative position of keywords in the sentence to arrive at a weighted average embedding.

At this point the system is working with two distinct elements: a) A collection of keywords that are used to identify relevant moments and b) A collection of word embeddings, which are vectors in a N-dimensional feature space, as surrogates for individual keywords or sentences that are part of an utterance.

Figure 6:
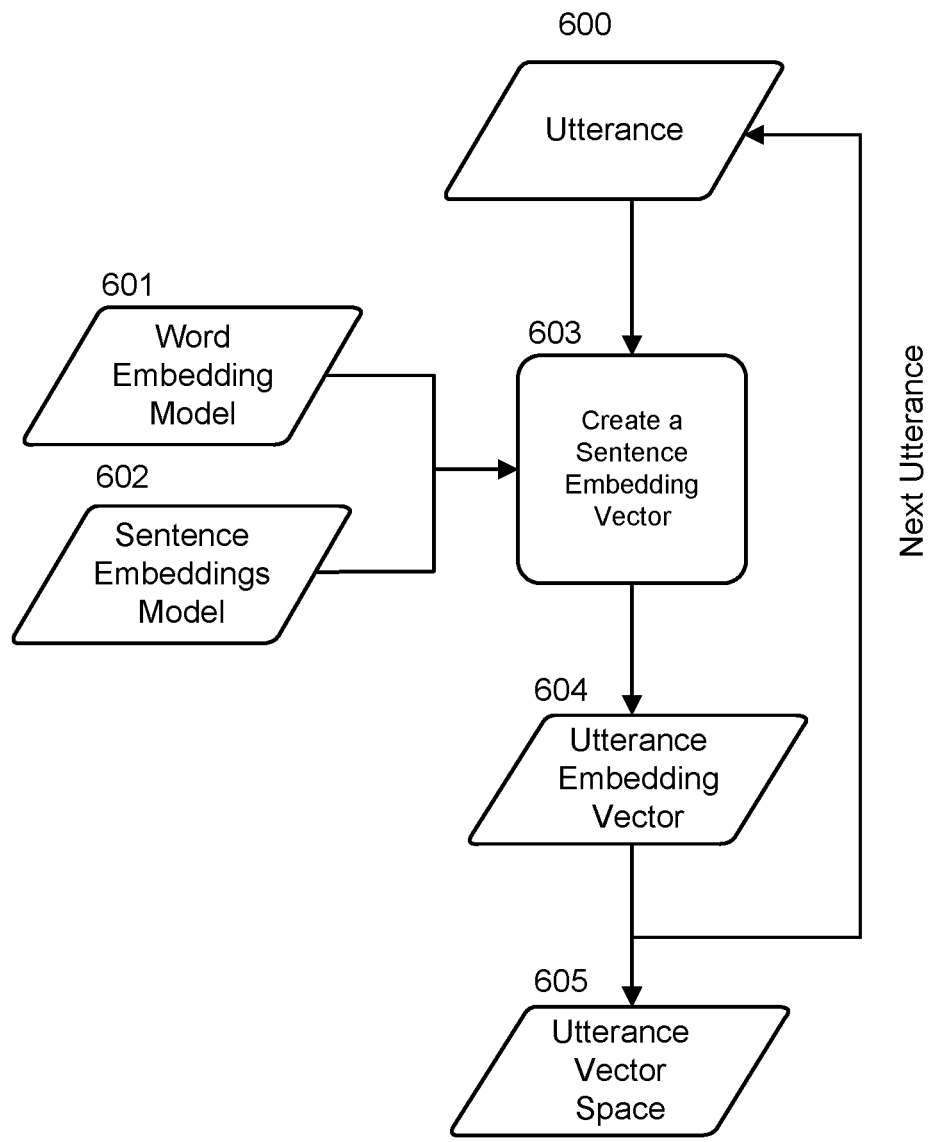
FIG. 6 shows one embodiment of an exemplary manner of generating a vector space of utterances.

FIG. 6 shows a method to create a vector space of utterances. FIG. 2 begins with an utterance (600) and end up with an Utterance Vector Space (605). The system creates a sentence embedding vector using 603. The process uses a Word Embeddings Model (601) which is used to describe a word along multiple senses. Although a machine learning method doesn't extract different senses of a word as humans understand it, for the sake of example, we can think of the word "King" and notice that it embodies multiple senses such as "Monarch", "Wealthy", "Powerful", "Authority", and "Male". When someone says "John lives like a king", the use of the word "king" in this utterance relies on the senses "male" and "wealthy". Word Embeddings models for English and all major human languages are widely available. Tools to create word embeddings models from scratch are also widely available. The process (603) also uses a sentence embeddings model/algorithm such as Sent2Vec, which often consumes a word embeddings model as input, to generate an N-dimensional Utterance Embedding Vector (604). We can choose N to be any number we deem suitable. In practice, N is between 500 and 600. We repeat this process for each utterance and all resulting utterance embedding vectors are represented in an Utterance Vector Space model (605).

Figure 7:
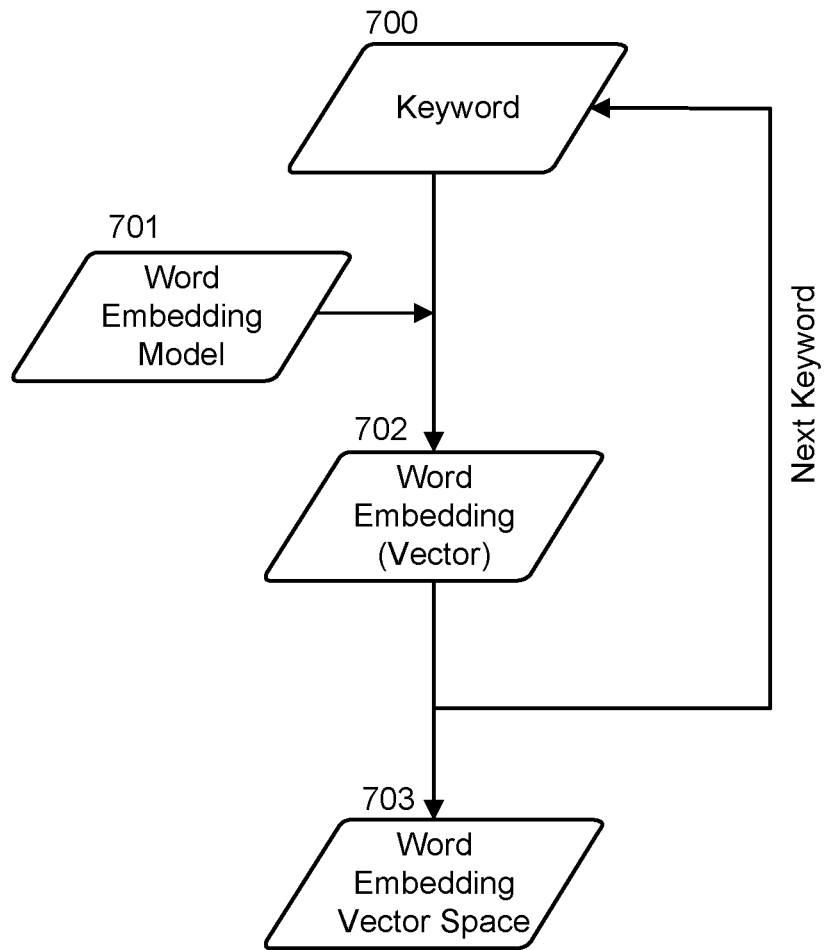
FIG. 7 shows one embodiment of an exemplary manner of generating a vector space of keywords.

FIG. 7 shows a method to create a vector space of keywords. We start with a keyword (700) and end up with a Word embeddings Vector Space model (703). The process of creating Word Embeddings (702) is well understood and tools are the same as those mentioned in the description of FIG. 6 above. The Word Embeddings model (701) is the same as 601 mentioned above.

Figure 8:
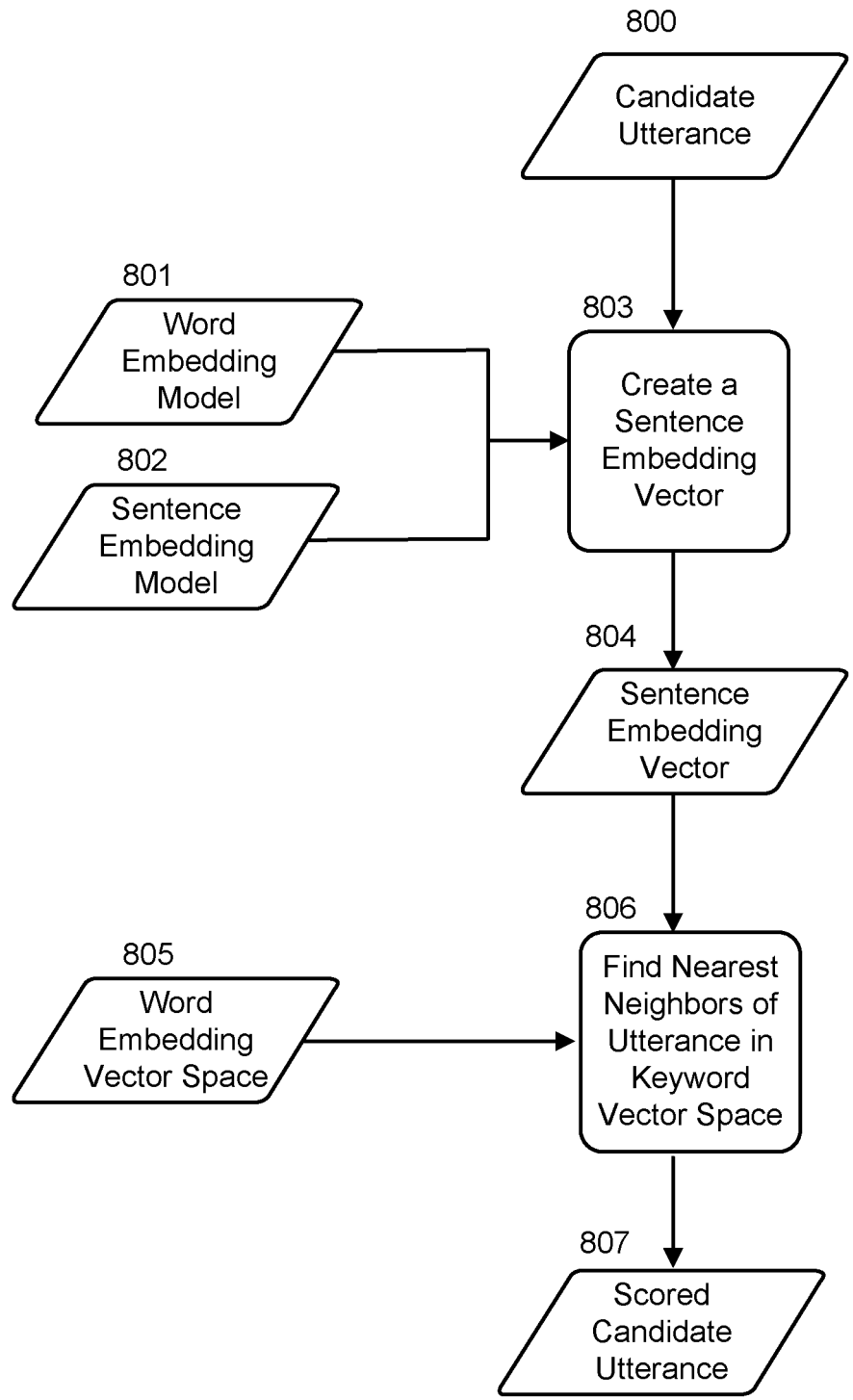
FIG. 8 shows one embodiment of an exemplary manner of generating keyword embeddings to score a candidate utterance.

FIG. 8 shows a method to use keyword embeddings to score a candidate utterance. The method described here accounts for the contribution of keyword search history to personalize the detection of important moments. The set of keywords we start with is obtained from a user's search history. The set incorporates recency and frequency information such that more recent and more frequent searches carry a higher relative weighting. We start the method with a Candidate Utterance (800) and end up with a Scored Candidate Utterance (807), which captures the contribution of a user's search history. The process of creating a Sentence Embedding Vector (803), using Word Embeddings Model (801) and Sentence Embeddings Model (802) is similar to the method described in FIG. 2. Next we find nearest neighbors of the utterance (806) in the keyword vector space (805) which was created as described in FIG. 3. The process of finding nearest neighbors in a vector space is well understood and tools to facilitate that search are widely available. This results in k keywords that are closest, as indicated by a similarity score, to the candidate utterance. We accumulate their similarity scores to score the candidate utterance. The accumulation of scores from these k nearest keywords effectively captured the contribution of those keywords. As mentioned above, each keyword is relatively weighted based on its recency and frequency and that weighting is used to qualify its contribution to the candidate utterance's score in 807.

Figure 9:
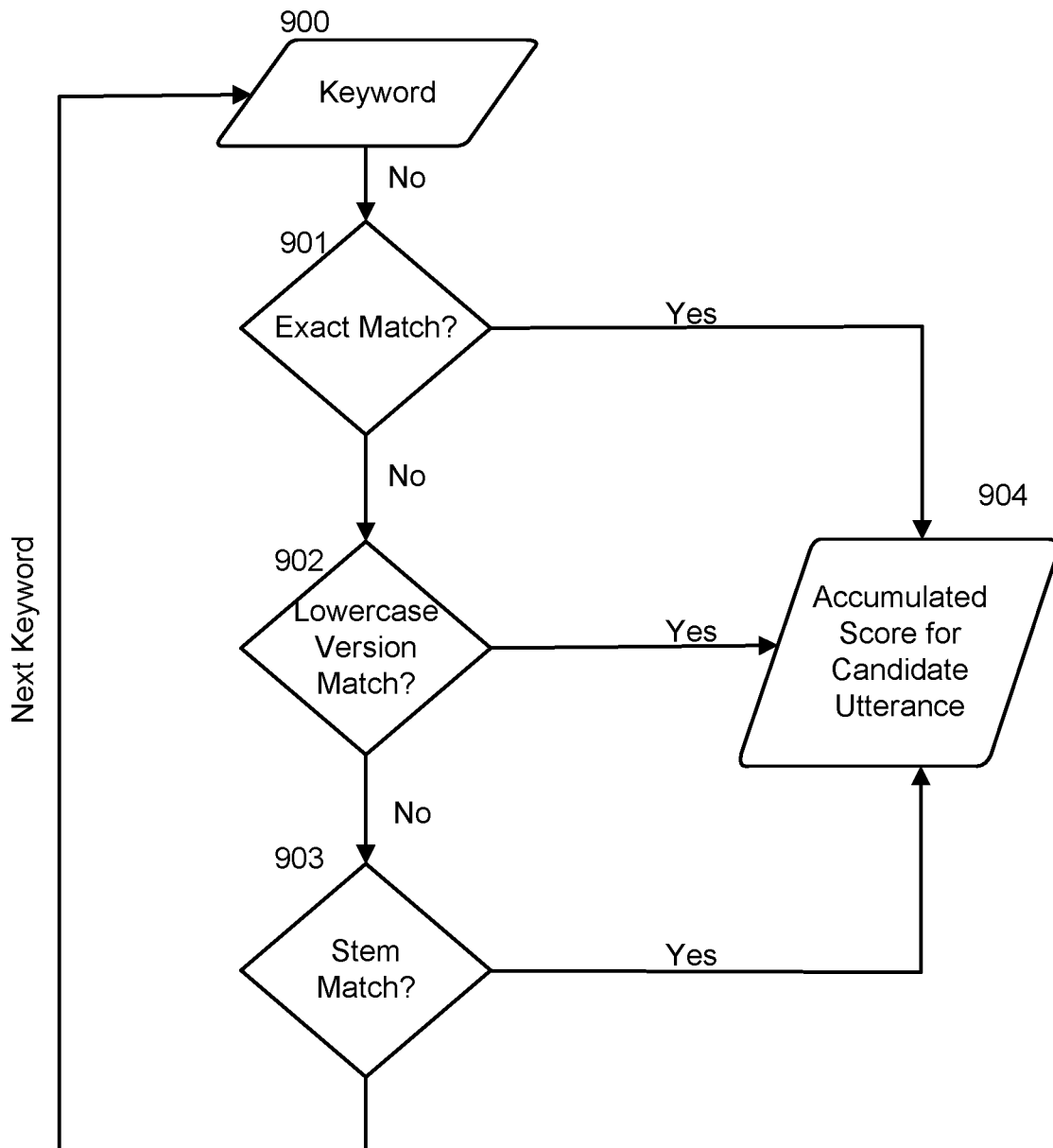
FIG. 9 shows one embodiment of an exemplary manner of using keywords to score a candidate utterance.

FIG. 9 shows a method to use keywords to score a candidate utterance. While the method in FIG. 8 captured the contribution of keyword embeddings to an utterance's score, the method in FIG. 9 is used to capture the contribution of the actual keywords. For example, if a user's search history has the keyword "sequences", an utterance with the same word is likely to be more relevant than an utterance without that word. We start with the same set of keywords as in FIG. 7, with recency and frequency contributing to their relative weighting, and process them to compute their contribution. For each keyword (900), we check if it occurs in the candidate utterance. If yes, we assign a higher weight to this exact match and accumulate to the utterance's score in 904. If no, we check if a normalized (lowercase; unicode Form-D normalization) version (902) occurs in the utterance. If yes, we assign a relatively lower weight than an exact match and accumulate to the score in 904. If we found no match for the normalized version, we check if a stemmed version (903) of the word appears in the utterance. For e.g. words "sequences" and "sequence" share the same stem "sequenc", so they match through their stem. If such a match exists we accumulate to the score in 904 with even lower relative weight than a normalized match (902). If there is no match, then that specific keyword did not contribute to the relevance of the utterance.

Figure 10:
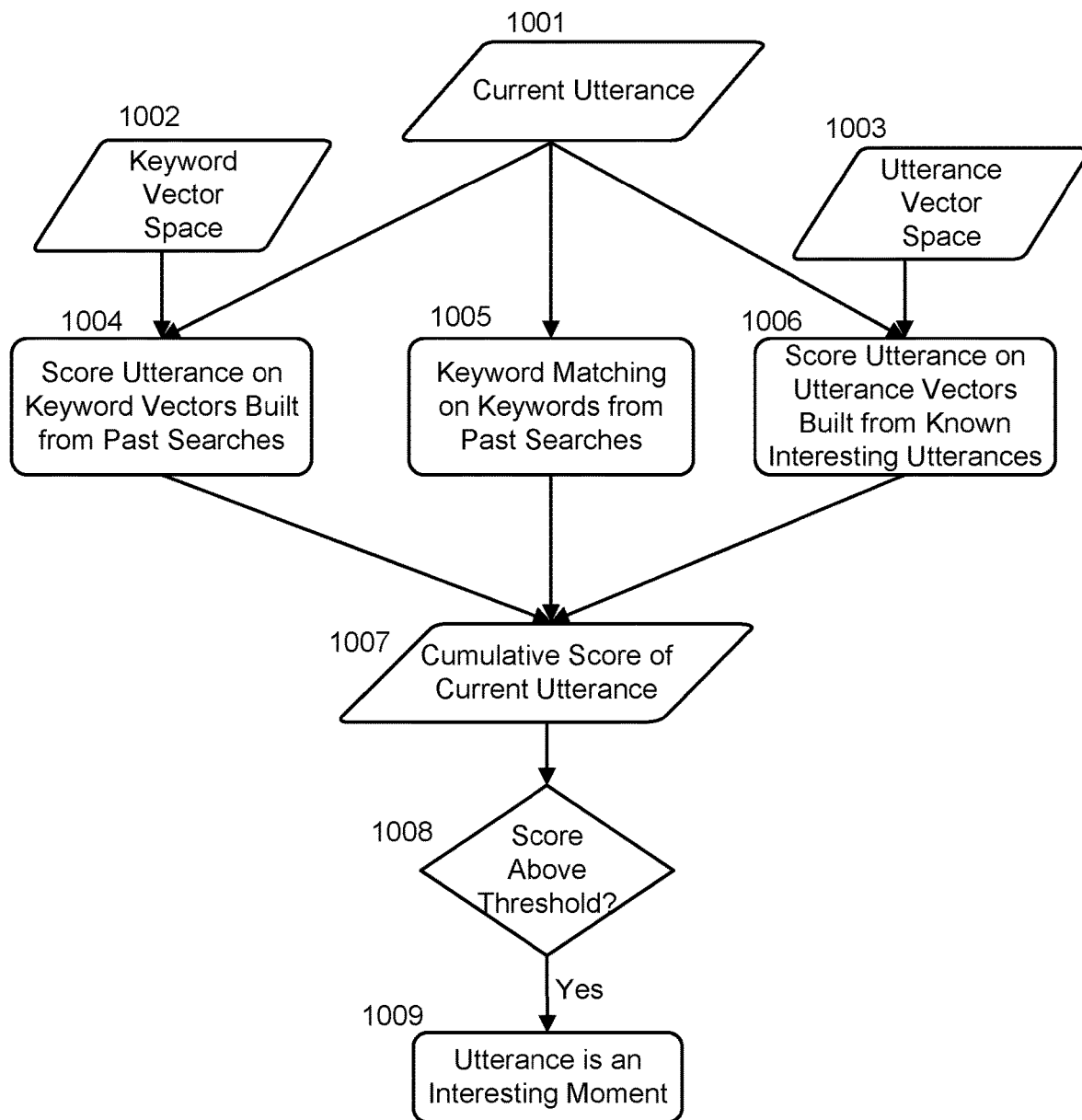
FIG. 10 shows one embodiment of an exemplary manner of determining whether a candidate utterance is an interesting moment.

FIG. 10 shows a method to determine if a candidate utterance is an interesting moment. In this figure we combine the contributions from three different sources. We start with an utterance (1001) and end up with a determination, in real-time, if that utterance is considered relevant to the user. If it is considered relevant, the accumulated score is used to rank it relative to other interesting moments that were detected in that session. We score the utterance on keyword vectors (1004) as described in FIG. 8. 1004 uses a keyword vector space (1002) created using the method described in FIG. 7. The keyword matching process (1005) is the same process described in FIG. 9. The process of scoring the utterances against known interesting utterances (1006) is a process similar to 806 described in FIG. 8, except that the Utterance Vector Space (603) searched by 1006 was constructed with a set of moments known to be of interest to the user. The process in 1006 is thereby accounting for a user's expressed interest (they indicated, implicitly or explicitly, what moments were of interest to them in the past). The method described in FIG. 6 is used to compute the Utterance Vector Space (1003) from this list of known moments of interest for the user. We accumulate the scores from 1004, 1005, and 1006 in 1007. This cumulative score of current utterance (607) represents a personalized score associated with the current utterance, using the user's search history and marked interesting moments as input. Next we determine if this cumulative score exceeds a specific threshold (1008). If yes, we have detected an interesting moment in real-time and proceed to mark it as such in 1009.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for surfacing relevant moments to a conversation participant through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer-readable medium comprising instructions encoded thereon to identify a moment in a transcript, the instructions when executed by at least one processor causing the at least one processor to:
   receive a transcription of a conversation, the conversation being ongoing between a plurality of participants and the transcription received as the conversation continues;
   identify each participant of the plurality of participants;
   access a plurality of machine learning models, each machine learning model selected for a corresponding participant based on a respective profile of the corresponding participant;
   apply, as input to each machine learning model of the plurality of machine learning models, the transcription on an ongoing basis as the conversation continues;
   receive, as output from each respective machine learning model, a respective portion of the transcription having relevance to its respective participant; and
   generate for display, to each respective participant, on an ongoing basis as the conversation from which the transcription was received continues, respective information pertaining to the respective portion, each respective information tailored to each respective participant based on the respective portion output by the respective machine learning model.

2. The non-transitory computer-readable medium of claim 1, wherein the instructions to access the plurality of machine learning models further comprise instructions that when executed causes the at least one processor to, for each respective participant:
   determine a group of which the respective participant is a part;
   identify a group model trained based on preferences of the group; and
   assign the group model as the machine learning model corresponding to the respective participant.

3. The non-transitory computer-readable medium of claim 2, wherein the group model is used to surface moments to other users who are a part of the group.

4. The non-transitory computer-readable medium of claim 1, further comprising instructions to train a given machine learning model of the plurality of machine learning models to correspond to a given participant, the instructions when executed causing the at least one processor to:
   access a profile of the given participant, the profile indicating terms in historical search queries performed by the given participant, and indicating interaction by the given participant with results of the historical search queries; and
   label the terms based on the indicated participant interaction.

5. The non-transitory computer-readable medium of claim 4, wherein a strength of association between the terms and the label is updated based on:
   a frequency with which the given participant uses the terms; and
   how recently, relative to a present time, a term was used in the historical search queries by the given participant.

6. The non-transitory computer-readable medium of claim 1, wherein the instructions to apply, as input to each machine learning model, the transcription further comprise instructions that when executed causes the at least one processor to:
   identify one or more word embeddings corresponding to the transcription; and
   apply, as additional input to each machine learning model, the one or more word embeddings.

7. The non-transitory computer-readable medium of claim 1, wherein the instructions to receive, as output from each respective machine learning model, a respective portion of the transcription having relevance to its respective participant further comprise instructions that when executed cause the at least one processor to:
   receive a plurality of scores for different portions of the transcription;
   compare each score of the plurality of scores to a threshold; and
   determine the portion of the transcription having relevance to the respective participant based on its corresponding score exceeding the threshold.

8. The non-transitory computer-readable medium of claim 1, further comprising instructions to receive the transcription automatically and in real-time during the conversation.

9. A method for identifying a moment in a transcript, the method comprising:
   receiving a transcription of a conversation, the conversation being ongoing between a plurality of participants and the transcription received as the conversation continues;
   identifying each participant of the plurality of participants;
   accessing a plurality of machine learning models, each machine learning model selected for a corresponding participant based on a respective profile of the corresponding participant;
   applying, as input to each machine learning model of the plurality of machine learning models, the transcription on an ongoing basis as the conversation continues;
   receiving, as output from each respective machine learning model, a respective portion of the transcription having relevance to its respective participant; and
   generating for display, to each respective participant, on an ongoing basis as the conversation from which the transcription was received continues, respective information pertaining to the respective portion, each respective information tailored to each respective participant based on the respective portion output by the respective machine learning model.

10. The method of claim 9, wherein accessing the plurality of machine learning models further comprises, for each respective participant:
    determining a group of which the respective participant is a part;

identifying a group model trained based on preferences of the group; and assigning the group model as the machine learning model corresponding to the respective participant.

11. The method of claim 10, wherein the group model is used to surface moments to other users who are a part of the group.

12. The method of claim 9, further comprising training a given machine learning model of the plurality of machine learning models to correspond to a given participant by:

accessing a profile of the given participant, the profile indicating terms in historical search queries performed by the given participant, and indicating interaction by the given participant with results of the historical search queries; and labeling the terms based on the indicated participant interaction.

13. The method of claim 12, wherein a strength of association between the terms and the label is updated based on:

a frequency with which the given participant uses the terms; and how recently, relative to a present time, a term was used in the historical search queries by the given participant.

14. The method of claim 9, applying, as input to each machine learning model, the transcription further comprises:

identifying one or more word embeddings corresponding to the transcription; and applying, as additional input to each machine learning model, the one or more word embeddings.

15. The method of claim 9, wherein receiving, as output from each respective machine learning model, a respective portion of the transcription having relevance to its respective participant further comprises:

receiving a plurality of scores for different portions of the transcription;

comparing each score of the plurality of scores to a threshold; and determining the portion of the transcription having relevance to the respective participant based on its corresponding score exceeding the threshold.

16. The method of claim 9, further comprising receiving the transcription automatically and in real-time during the conversation.

17. A system for identifying a moment in a transcript, the system comprising:

memory with instructions encoded thereon; and one or more processors that, when executing the instructions, are caused to perform operations comprising:

receiving a transcription of a conversation, the conversation being ongoing between a plurality of participants and the transcription received as the conversation continues;

identifying each participant of the plurality of participants;

accessing a plurality of machine learning models, each machine learning model selected for a corresponding participant based on a respective profile of the corresponding participant;

applying, as input to each machine learning model of the plurality of machine learning models, the transcription on an ongoing basis as the conversation continues;

receiving, as output from each respective machine learning model, a respective portion of the transcription having relevance to its respective participant; and generating for display, to each respective participant, on an ongoing basis as the conversation from which the transcription was received continues, respective information pertaining to the respective portion, each respective information tailored to each respective participant based on the respective portion output by the respective machine learning model.

18. The system of claim 17, wherein accessing the plurality of machine learning models further comprises, for each respective participant:

determining a group of which the respective participant is a part;

identifying a group model trained based on preferences of the group; and assigning the group model as the machine learning model corresponding to the respective participant.

19. The system of claim 18, wherein the group model is used to surface moments to other users who are a part of the group.

20. The system of claim 17, the operations further comprising training a given machine learning model of the plurality of machine learning models to correspond to a given participant by:

accessing a profile of the given participant, the profile indicating terms in historical search queries performed by the given participant, and indicating interaction by the given participant with results of the historical search queries; and labeling the terms based on the indicated participant interaction.

* * * * *

UNITED STATES PATENT AND TRADEMARK OFFICE
CERTIFICATE OF CORRECTION

| | |
|---|---|
| PATENT NO. | : 12,243,536 B2 |
| APPLICATION NO. | : 18/233303 |
| DATED | : March 4, 2025 |
| INVENTOR(S) | : Nareddy et al. |

It is certified that error appears in the above-identified patent and that said Letters Patent is hereby corrected as shown below:

In the Claims

In Column 19, in Claim 14, Line 25, after "claim 9," insert -- wherein --.

Signed and Sealed this
Twenty-seventh Day of May, 2025

Coke Morgan Stewart
*Acting Director of the United States Patent and Trademark Office*